US010419934B1

(12) United States Patent
Săpunaru et al.

(10) Patent No.: US 10,419,934 B1
(45) Date of Patent: Sep. 17, 2019

(54) SYSTEMS AND METHODS FOR AUTHENTICATING USERS BASED ON ENRICHED DATA

(71) Applicant: Facebook, Inc., Menlo Park, CA (US)

(72) Inventors: Tudor-Corneliu Săpunaru, London (GB); Ziad Traboulsi, Singapore (SG)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 15/975,376

(22) Filed: May 9, 2018

(51) Int. Cl.
*H04W 12/06* (2009.01)
*H04W 12/02* (2009.01)
*H04L 12/58* (2006.01)
*H04L 9/32* (2006.01)
*H04W 4/12* (2009.01)
*H04L 29/08* (2006.01)

(52) U.S. Cl.
CPC .......... *H04W 12/06* (2013.01); *H04L 9/3213* (2013.01); *H04L 51/02* (2013.01); *H04W 4/12* (2013.01); *H04W 12/02* (2013.01); *H04L 67/10* (2013.01)

(58) Field of Classification Search
CPC .. G06F 21/34; G06F 21/45; G06F 2221/2117; H04L 2209/80; H04L 63/0428; H04L 63/08; H04L 9/3215; H04L 63/0853; H04L 63/0869; H04W 76/12; H04W 76/32; G06Q 50/01; G06Q 20/4014
See application file for complete search history.

(56) References Cited

U.S. PATENT DOCUMENTS

| | | | |
|---|---|---|---|
| 2009/0089882 A1* | 4/2009 | Hofmann | H04N 7/163 726/28 |
| 2015/0113625 A1* | 4/2015 | Gandhi | H04L 9/3271 726/7 |
| 2016/0239839 A1* | 8/2016 | Dillard | G06Q 20/0453 |
| 2016/0344730 A1* | 11/2016 | Holz | H04L 63/0876 |
| 2017/0140174 A1* | 5/2017 | Lacey | G06F 21/6245 |
| 2018/0083894 A1* | 3/2018 | Fung | H04L 51/02 |
| 2018/0109526 A1* | 4/2018 | Fung | H04L 63/168 |
| 2018/0332042 A1* | 11/2018 | Yu | H04L 63/0884 |
| 2019/0102078 A1* | 4/2019 | Bhatt | G06F 3/04847 |

* cited by examiner

*Primary Examiner* — Liton Miah
(74) *Attorney, Agent, or Firm* — Sheppard Mullin Richter & Hampton LLP

(57) ABSTRACT

Systems, methods, and non-transitory computer-readable media can receive at least one message sent from a computing system, the at least one message being sent to a first user by a second user. The message includes an authentication option. A request for accessing information associated with the authentication option is sent to the computing system in response to a selection of the at least one authentication option by the first user. The request is enriched to include a carrier identity of the first user by a mobile network operator. The first user is authenticated based at least in part on the accessed information and the carrier identity of the first user included in the enriched request.

20 Claims, 7 Drawing Sheets

500

Receive at least one message sent from a computing system, the at least one message being sent to a first user by a second user, wherein the message includes an authentication option, wherein a request for accessing information associated with the authentication option is sent to the computing system in response to a selection of the at least one authentication option by the first user, and wherein the request is enriched to include a carrier identity of the first user by a mobile network operator, wherein the first user is authenticated based at least in part on the accessed information and the carrier identity of the first user included in the enriched request

SYSTEMS AND METHODS FOR AUTHENTICATING USERS BASED ON ENRICHED DATA

FIELD OF THE INVENTION

The present technology relates to the field of authentication. More particularly, the present technology relates to techniques for authenticating users based on enriched data.

BACKGROUND

Today, people often utilize computing devices (or systems) for a wide variety of purposes. Users can use their computing devices to, for example, interact with one another, create content, share information, and access information. In some instances, a computing device can be associated with a phone number. A user can access a software application running on the computing device to make and receive voice calls.

SUMMARY

Various embodiments of the present disclosure can include systems, methods, and non-transitory computer readable media configured to receive at least one message sent from a computing system, the at least one message being sent to a first user by a second user, wherein the message includes an authentication option. A request for accessing information associated with the authentication option is sent to the computing system in response to a selection of the at least one authentication option by the first user, and wherein the request is enriched to include a carrier identity of the first user by a mobile network operator. The first user is authenticated based at least in part on the accessed information and the carrier identity of the first user included in the enriched request.

In some embodiments, the second user is a software application running on the computing system that is configured to analyze messages addressed to the second user and to send generated responses to those messages through the messaging system.

In some embodiments, the software application is a cloud-based software application.

In some embodiments, the carrier identity corresponds to a phone number associated with the first user as determined by the mobile network operator.

In some embodiments, the at least one authentication option, when selected, accesses a Uniform Resource Locator (URL) that includes a verification token generated for the first user.

In some embodiments, the verification token generated for the first user is determined based at least in part on the accessed URL; an identity of the first user in the messaging system is determined based at least in part on the verification token; and a third-party account associated with the carrier identity is determined.

In some embodiments, the systems, methods, and non-transitory computer readable media are configured to associate the first user with the carrier identity included in the enriched request.

In some embodiments, the carrier identity corresponds to a phone number, and wherein an account of the first user in the messaging system is associated with the phone number.

In some embodiments, the request for accessing the information is sent through the mobile network operator.

In some embodiments, the request is sent over one or more cellular networks.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

BRIEF DESCRIPTION OF THE DRAWINGS

FIG. 5 illustrate an example method, according to an embodiment of the present disclosure.

Figure 1:
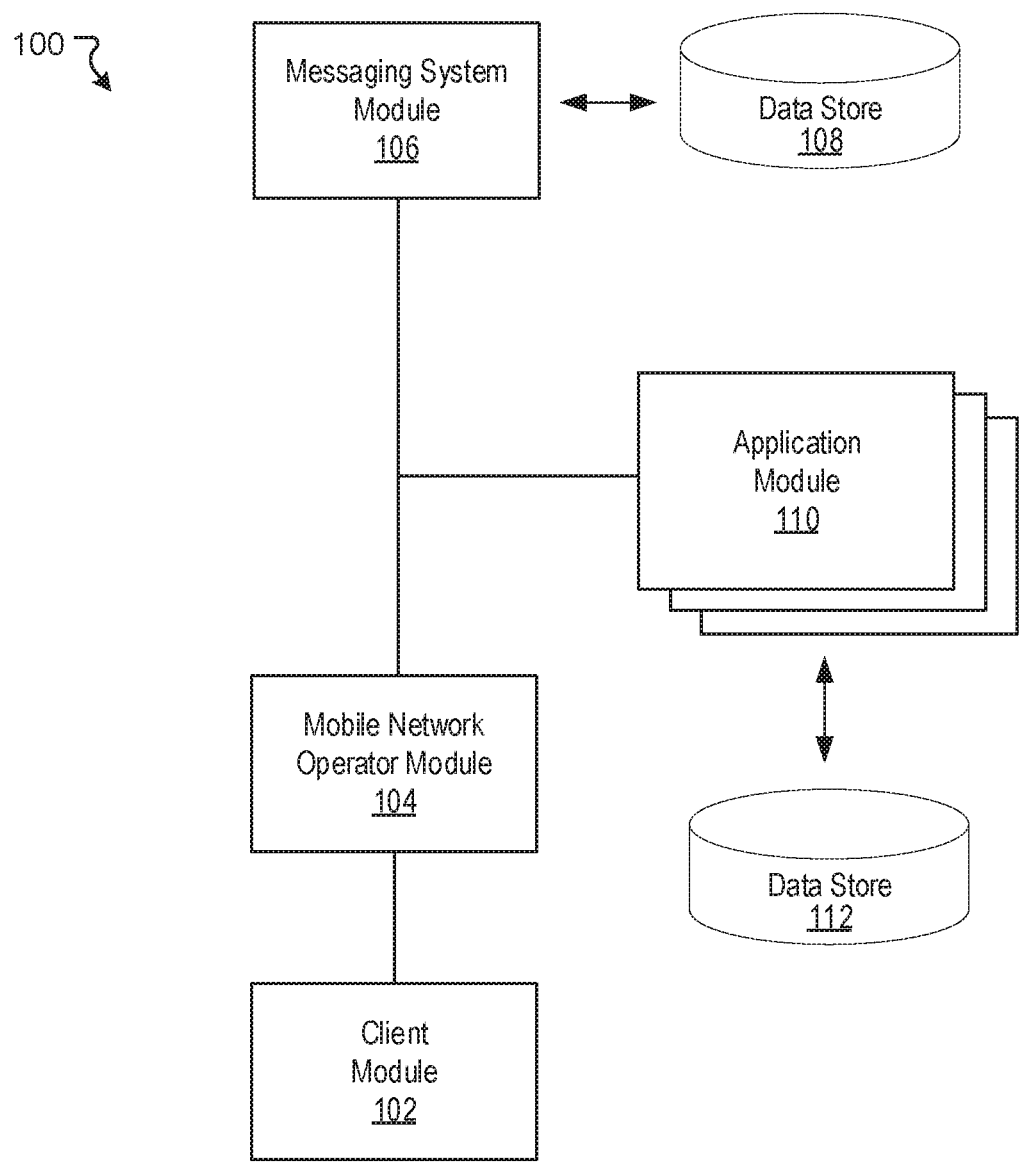
FIG. 1 illustrates an example system, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Approaches for Authenticating Users Based on Enriched Data

People use computing devices (or systems) for a wide variety of purposes. For example, users can access a messaging system (e.g., social networking system) to communicate with other users. In general, each user of the messaging system is associated with a unique username (or login credential) with which that user can be identified. In some instances, users of the messaging system may also want to interact with business entities through the messaging system. For example, a customer (e.g., username "user991") may exchange messages with an automated chat bot of some company (e.g., "Example Co.") through the messaging system. In this example, any messages the customer sends to the automated chat bot will be associated with the customer's username ("user991") in the messaging system. In this scenario, the automated chat bot is aware of the customer's identity in the messaging system ("user991") but not aware of the customer's identity as recognized by the company. In other words, the automated chat bot may not have enough information to identify an account that is associated with the customer ("user991") at the company ("Example Co."). However, in order to process the customer's inquiry, the automated chat bot typically needs to determine the customer's identity as recognized by the company. For example, the automated chat bot may need to use the customer's company-recognized identity to access the customer's account information. One conventional approach for authenticating users in this scenario involves phone number based authentication. Under this approach, the customer ("user991") provides the automated chat bot with a phone number. The automated chat bot sends a pass code in an SMS (Short Message Service) message to a computing device associated with the provided phone number. The customer can access the pass code from the SMS message and can provide the pass code in a message sent to the automated chat bot through the messaging system. The automated chat bot can confirm the pass code and, upon confirmation, can authenticate the customer as the owner of the provided phone number. In some instances, the confirmed phone number may be used to determine the customer's company-recognized identity. Another conventional approach involves the automated chat bot sending the customer a message that includes a webview through the messaging system. The webview can function as an in-conversation web page that is accessible by the customer. Within this web page, the customer can provide login credentials for accessing an account provided by the company. These login credentials can be validated by computing systems of the company and, once validated, the company is able to correlate the customer's account with the customer's identity ("user991") in the messaging system. These conventional approaches have a number of drawbacks. For example, these conventional approaches place an added burden on users to authenticate themselves. In general, such added burden can discourage users from accessing myriad features that require authentication. Accordingly, such conventional approaches may not be effective in addressing these and other problems arising in computer technology.

An improved approach rooted in computer technology overcomes the foregoing and other disadvantages associated with conventional approaches specifically arising in the realm of computer technology. In various embodiments, users of a 3rd party platform (e.g. a messaging system) can be authenticated by entities (e.g., automated chat bots) using data that has been enriched by mobile network operators (or mobile carriers). For example, a user (e.g., "JDoe") of the messaging system may initiate a text-based conversation with an automated chat bot associated with a company (e.g., "Example Company") by sending one or more messages through the platform (e.g. the messaging system). The messaging system can send a notification addressed to a username associated with the automated chat bot (e.g., "Example Company Helper Bot") to inform the bot of the initiated conversation. In some embodiments, the automated chat bot can be a software application running on one or more computing systems. Moreover, the software application can analyze messages addressed to the automated chat bot in the messaging system and can send generated responses to those messages also through the messaging system. In some embodiments, the automated chat bot can authenticate the user ("JDoe") by associating a generated verification token (e.g., "token456") with the user. The bot can then message the user an authentication button (e.g., a webview button) through the messaging system. In various embodiments, the user can select the authentication button to initiate authentication based on data that has been enriched by the user's mobile network operator. For example, in some embodiments, when the user selects the authentication button, a request is made by a computing device of the user to access a link (e.g., a Uniform Resource Locator (URL)) which contains (or references) the verification token ("token456") generated for the user. In some embodiments, the user accessing the link may result in a call to an interface (application programming interface) for interacting with the automated chat bot which is hosted directly on the developer side and does not need to reach the platform. The request can be sent through one or more networks (e.g., cellular networks). In such embodiments, before sending the request, a computer networking system associated with the user's mobile network operator can capture and enrich the request with a carrier identity (e.g., phone number) associated with the user. The computer networking system then forwards the enriched request to a page hosted by the automated chat bot developer over one or more networks (e.g., the internet). Upon receiving the enriched request, system on the developer side can determine the user's carrier identity (e.g., phone number) included in the enriched request along with the verification code ("token456") included in the link. In some embodiments, the developer system can thus identify an account associated with the user ("JDoe") based on the user's carrier identity (e.g., phone number). In some embodiments, the developer system can then associate (or map) the carrier identity (e.g., phone number) with the user's identity in the messaging system ("JDoe") since the system knows that it has sent the URL together with the associated token ('token456') only to the user JDoe. Many variations are possible.

FIG. 1 illustrates an example system 100, according to an embodiment of the present disclosure. As shown in the example of FIG. 1, the system 100 can include a client module 102, a mobile network operator module 104, a messaging system module 106, and an application module 110. In some instances, the example system 100 can include at least one data store 108. The client module 102, the mobile network operator module 104, the messaging system module 106, and the application module 110 can interact with one another over one or more networks. In various embodiments, the network(s) can be any wired or wireless computer network through which devices can exchange data. For example, the network(s) can be a cellular network, a personal area network, a local area network, or a wide area network, to name some examples. The components (e.g., modules, elements, etc.) shown in this figure and all figures herein are exemplary only, and other implementations may include additional, fewer, integrated, or different components. Some components may not be shown so as not to obscure relevant details.

In some embodiments, the client module 102, the mobile network operator module 104, the messaging system module 106, and the application module 110 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the client module 102, the mobile network operator module 104, the messaging system module 106, and the application module 110 or at least portions thereof can be implemented using one or more computing devices or systems that include one or more servers, such as network servers or cloud servers. In some instances, the client module 102, the mobile network operator module 104, the messaging system module 106, and the application module 110 can, in part or in whole, be implemented within or configured to operate in conjunction with a social networking system (or service), such as the social networking system 630 of FIG. 6. In some instances, the client module 102 can be, in part or in whole, implemented within or configured to operate in conjunction or be integrated with a client computing device, such as the user device 610 of FIG. 6. The client module 102, the mobile network operator module 104, the messaging system module 106, and the application module 110 can be implemented as or within a dedicated application (e.g., app), a program, or an applet running on a user computing device or client computing system. The application incorporating or implementing instructions for performing some, or all, functionality of the client module 102, the mobile network operator module 104, the messaging system module 106, and the application module 110 can be created by a developer. The application can be provided to or maintained in a repository. In some cases, the application can be uploaded or otherwise transmitted over a network (e.g., Internet) to the repository. For example, a computing system (e.g., server) associated with or under control of the developer of the application can provide or transmit the application to the repository. The repository can include, for example, an "app" store in which the application can be maintained for access or download by a user. In response to a command by the user to download the application, the application can be provided or otherwise transmitted over a network from the repository to a computing device associated with the user. For example, a computing system (e.g., server) associated with or under control of an administrator of the repository can cause or permit the application to be transmitted to the computing device of the user so that the user can install and run the application. The developer of the application and the administrator of the repository can be different entities in some cases, but can be the same entity in other cases. It should be understood that many variations are possible.

In some embodiments, the messaging system module 106 can be configured to communicate and/or operate with the at least one data store 108 in the example system 100. The at least one data store 108 can be configured to store and maintain various types of data. In various embodiments, the at least one data store 108 can store data relevant to function and operation of the messaging system module 106. One example of such data can be mappings between user carrier identities (or addresses) (e.g., phone numbers) and usernames (or logins) in the messaging system (e.g., the social networking system 630 of FIG. 6). In some implementations, the at least one data store 108 can store information associated with the social networking system (e.g., the social networking system 630 of FIG. 6). The information associated with the social networking system can include data about users, social connections, social interactions, locations, geo-fenced areas, maps, places, events, pages, groups, posts, communications, content, feeds, account settings, privacy settings, a social graph, and various other types of data. In some implementations, the at least one data store 108 can store information associated with users, such as user identifiers, user information, profile information, user specified settings, content produced or posted by users, and various other types of user data. It should be appreciated that there can be many variations or other possibilities.

In some embodiments, the application module 110 can be configured to communicate and/or operate with the at least one data store 112 in the example system 100. The at least one data store 112 can be configured to store and maintain various types of data. In various embodiments, the at least one data store 112 can store data relevant to function and operation of the application module 110. One example of such data can be mappings between user carrier identities (or addresses) (e.g., phone numbers) and usernames (or logins) in the messaging system (e.g., the social networking system 630 of FIG. 6).

In various embodiments, the client module 102 can be configured to interact with the messaging system module 106 and/or the application module 110 through the mobile network operator module 104 and one or more network(s). For example, in some embodiments, the client module 102 can be implemented in a computing device, such as the user device 610 of FIG. 6. The mobile network operator module 104 can be implemented in one or more computer networking systems associated with a mobile network operator that provides wireless cellular service to the client module 102. In general, the client module 102 and the mobile network operator module 104 can exchange data with one another over cellular networks. A user operating the computing device in which the client module 102 is implemented can interact with the messaging system module 106 and/or the application module 110 by sending and receiving data through the mobile network operator module 104. The mobile network operator module 104 may communicate data between the client module 102 and the messaging system module 106 (or the application module 110) over one or more network(s) (e.g., the internet). In some instances, the user may want to initiate a text-based conversation (or messaging session) with an entity (e.g., customer service representative, automated chat bot, etc.) through the messaging system module 106. When the conversation is initiated, the messaging system module 106 can send a notification addressed to a username associated with the entity being contacted (e.g., "Safe-Mart Helper Bot") to inform the entity of the initiated conversation. In some instances, the entity can be associated with the application module 110. In various embodiments, the application module 110 can be a software application that can analyze messages sent to the entity through the messaging system module 106 and can send generated responses to those messages also through the messaging system module 106. In the example of FIG. 1, the application module 110 is implemented as a cloud-based software application that runs on one or more computing systems. In some embodiments, the entity can authenticate the user by associating a generated verification token (e.g., "token123") with the user. For example, the token "token123" can be associated with a username of the user (e.g., "user55") as recognized by the messaging system module 106. The entity can then send a message to the user that includes an authentication button (e.g., a webview button) through the messaging system module 106. In some embodiments, when the user selects the authentication button, a request (e.g., an HTTP GET request) is made by the client module 102 to access a link (e.g., a Uniform Resource Locator (URL) hosted on the application module 110 which contains (or references) the verification token ("token123") generated for the user ("user55"). In such embodiments, the mobile network operator module 104 can capture (or intercept) data traffic addressed to the messaging system module 106. The mobile network operator module 104 can then enrich the request with a carrier identity associated with a computing device of the user ("user55"). For example, the mobile network operator module 104 may include a phone number that is associated with the user in the request. The enriched request is then forwarded to the application module 110 through the network(s) 150. Upon receiving the request, the application module 110 can determine the user's carrier identity (e.g., phone number) included in the request along with the verification code ("token123") included in the link. The application module 110 can then associate (or map) the carrier identity (e.g., phone number) with the user's identity in the messaging system ("user55") since both of these identities were previously associated with the same verification token ("token123"). Many variations are possible. More details regarding the client module 102 will be provided below in reference to FIG. 2. More details regarding the application module 110 will be provided below in reference to FIG. 3. More details regarding the messaging system module 106 will be provided below in reference to FIG. 4.

Figure 2:
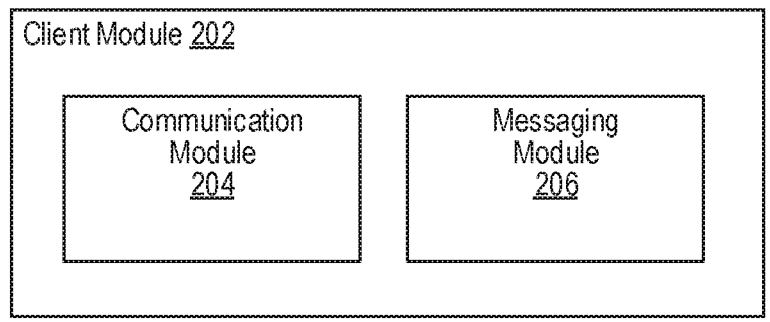
FIG. 2 illustrates an example client module, according to an embodiment of the present disclosure.

FIG. 2 illustrates an example client module 202, according to an embodiment of the present disclosure. In some embodiments, the client module 102 of FIG. 1 can be implemented with the client module 202. As shown in the example of FIG. 2, the client module 202 can include a communication module 204 and a messaging module 206.

The communication module 204 can be configured to utilize various technologies for sending and receiving data over various networks (e.g., cellular networks, POTS networks, the internet, etc.). In some embodiments, the communication module 204 can send and receive data through a mobile network operator (e.g., the mobile network operator module 104 of FIG. 1) that provides wireless cellular services that are accessible to the client module 202. In such embodiments, the communication module 204 can send and receive data through one or more cellular networks, for example. Many variations are possible.

The messaging module 206 can provide a messaging interface (e.g., a graphical user interface or an API) for exchanging messages between users. In some embodiments, the messaging interface provides options for exchanging messages with users of a messaging system (e.g., the messaging system module 106 of FIG. 1) through one or more computer networks. In some embodiments, the messaging system corresponds to a social networking system 630 as described in FIG. 6. In such embodiments, a user accessing the messaging interface can send and receive messages through the messaging system. In some embodiments, the messaging module 206 is implemented as a software application (e.g., social networking application, messenger application, etc.) that is capable of running on a computing device in which the client module 202 is implemented. Many variations are possible.

Figure 3:
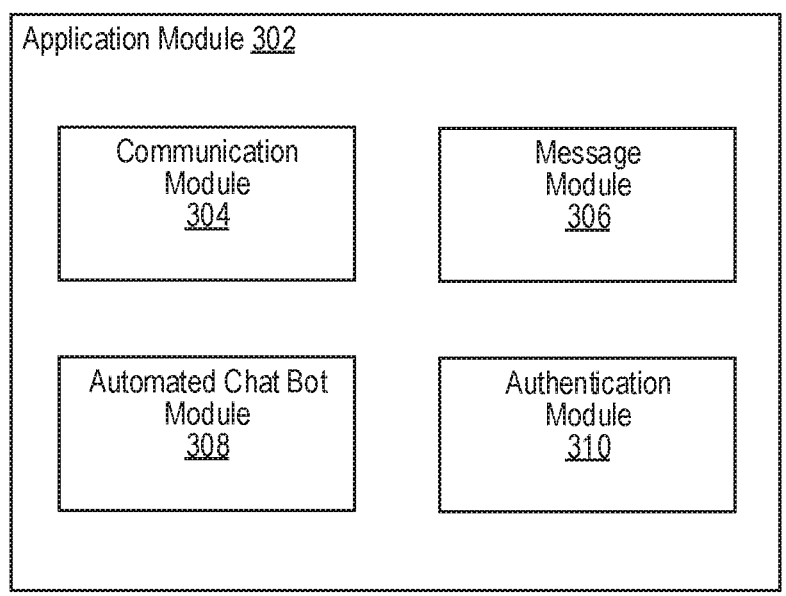
FIG. 3 illustrates an example application module, according to an embodiment of the present disclosure.

FIG. 3 illustrates an example application module 302, according to an embodiment of the present disclosure. In some embodiments, the application module 110 of FIG. 1 can be implemented with the application module 302. As shown in the example of FIG. 3, the application module 302 can include a communication module 304, a message module 306, an automated chat bot module 308, and an authentication module 310. In some embodiments, the application module 302 can be implemented as a software application (e.g., automated chat bot) running on one or more computing systems. In such embodiments, the automated chat bot can have a user identity (or username) in a messaging system (e.g., the messaging system module 106 of FIG. 1). Further, users of the messaging system can exchange messages with the automated chat bot by communicating with its corresponding user identity in the messaging system.

The communication module 304 can be configured to utilize various technologies for sending and receiving data over various networks (e.g., cellular networks, POTS networks, the internet, etc.).

The message module 306 can be configured to interact with the messaging system, for example, through one or more interfaces (e.g., application programming interfaces) provided by the messaging system. In some embodiments, the message module 306 can interact with the messaging system to access (or receive) messages sent to the automated chat bot by users of the messaging system. For example, when a user sends a message to the automated chat bot in the messaging system, the messaging system can provide the automated chat bot with access to the message, for example, through the one or more interfaces. In some embodiments, the message module 306 can interact with the messaging system to provide (or send) messages to users of the messaging system. For example, the automated chat bot can generate and send a message to a user through the one or more interfaces provided by the messaging system.

In some embodiments, responses to user messages may be generated by the automated chat bot module 308. In some embodiments, the automated chat bot module 308 can be trained to analyze and provide responses to text-based queries submitted by users in messages sent through the messaging system. Such text-based queries may include, for example, "What is my account balance?", "How much is my bill this month?", or "I want to order a product", to name some examples. In such embodiments, the automated chat bot module 308 can be trained to respond based on various artificial intelligence techniques including, for example, machine learning.

The authentication module 310 can be configured to authenticate users of the messaging system, as described above. In some embodiments, when authenticating a user, the authentication module 310 can obtain a token generated for the user. The authentication module 310 can interact with the message module 306 to send an authentication option (or button) to the user through the messaging system. The authentication option can be associated with a link (e.g., URL) that includes the verification token generated for the user. The user can then select the authentication option to access the link. In some embodiments, accessing the link may result in a request (or call) to an interface (application programming interface) hosted on the application module 302. The request can be sent through one or more networks (e.g., cellular networks). In such embodiments, before forwarding the request, a computer networking system associated with the user's mobile network operator can capture and enrich the request with a carrier identity (e.g., phone number) associated with the user. The computer networking system can then forward the enriched request to the application module 302 over one or more networks (e.g., the internet) and through the interface for interacting with the automated chat bot. Upon receiving the enriched request, the automated chat bot can determine the link that was sent to the user, the verification token generated for the user, and the carrier identity (e.g., phone number) of the user as provided by the mobile network operator. The authentication module 310 can then determine an account of the user that is associated with the carrier identity. In some embodiments, if no such account exists, the authentication module 310 can provide the user with an option to create an account. In some embodiments, the authentication module 310 can associate the user's identity in the messaging system (e.g., username) with the user's carrier identity (e.g., phone number). In some embodiments, the authentication module 310 can provide information describing this association (e.g., username, phone number) to the messaging system. Many variations are possible.

Figure 4:
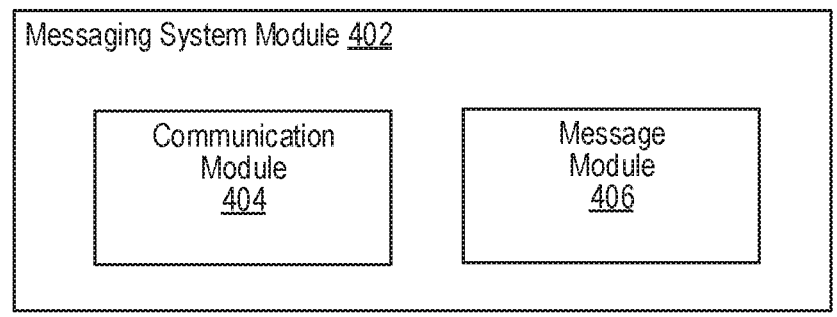
FIG. 4 illustrates an example of a messaging system module, according to an embodiment of the present disclosure.

FIG. 4 illustrates an example messaging system module 402, according to an embodiment of the present disclosure. In some embodiments, the messaging system module 106 of FIG. 1 can be implemented with the messaging system module 402. As shown in the example of FIG. 4, the messaging system module 402 can include a communication module 404 and a message module 406.

The communication module 404 can be configured to utilize various technologies for sending and receiving data over various networks (e.g., cellular networks, POTS networks, the internet, etc.).

Figure 6:
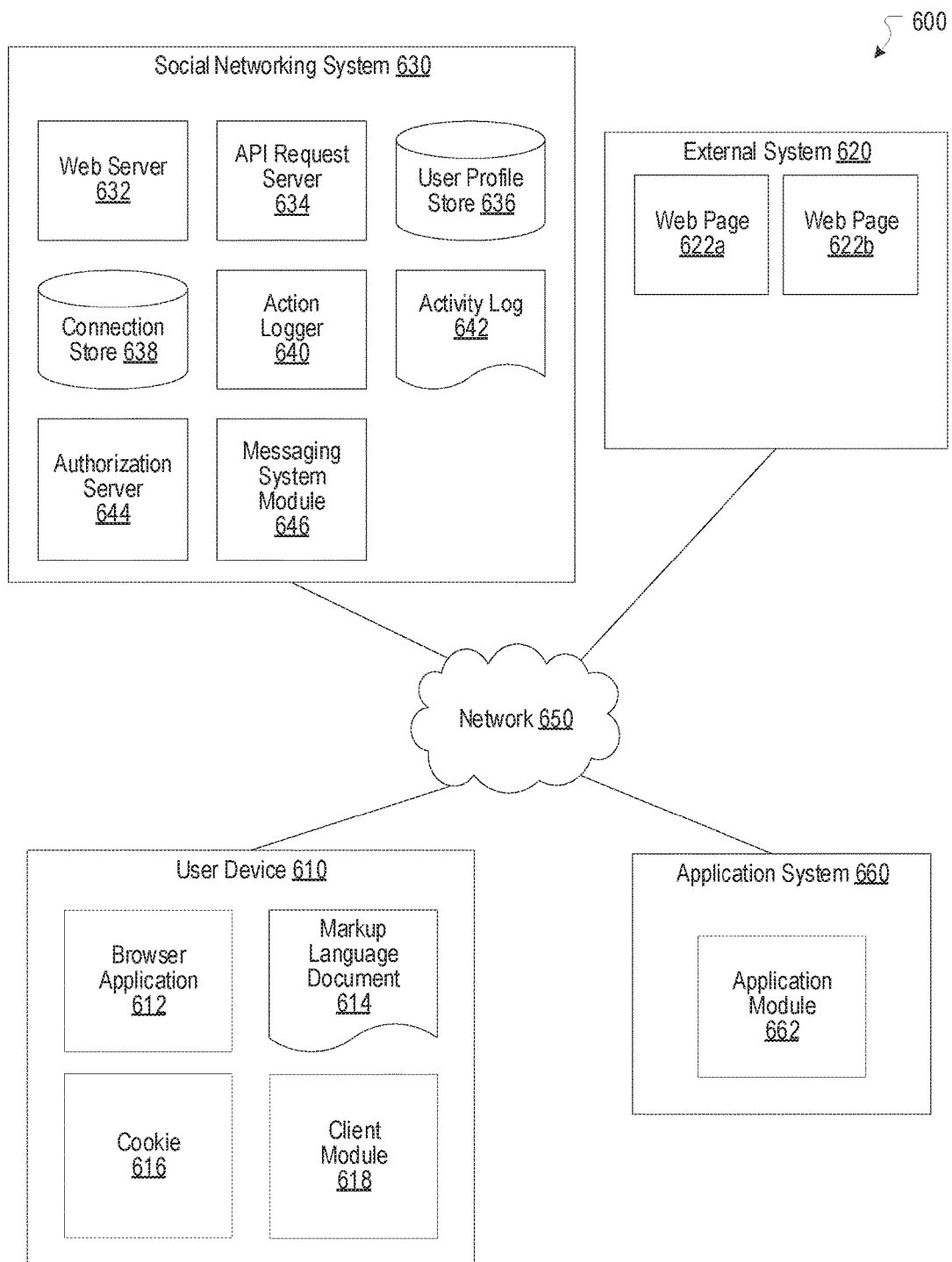
FIG. 6 illustrates a network diagram of an example system including an example social networking system that can be utilized in various scenarios, according to an embodiment of the present disclosure.

The message module 406 can be configured to receive and deliver messages sent among users of a messaging system in which the messaging system module 402 is implemented (e.g., the social networking system 630 of FIG. 6). In some embodiments, the message module 406 can provide one or more interfaces (e.g., application programming interfaces) through which entities (e.g., automated chat bots) can submit requests to be processed by the messaging system module 402. For example, in some embodiments, the message module 406 provides an interface (e.g., application programming interface) through which an automated chat bot can send messages addressed to users of the messaging system. The interface can also be used to access (or receive) messages addressed to the automated chat bot by users of the messaging system. In some embodiments, the interface can provide an option (or API call) to send an authentication option (or button) to a user of the messaging system, as described above. The message module 406 can deliver the authentication option in a message to the user through the messaging system. Many variations are possible.

FIG. 5 illustrates an example method 500, according to an embodiment of the present disclosure. It should be appreciated that there can be additional, fewer, or alternative steps performed in similar or alternative orders, or in parallel, within the scope of the various embodiments discussed herein unless otherwise stated.

At block 502, at least one message sent from a computing system is received, the at least one message being sent to a first user by a second user. The message includes an authentication option. A request for accessing information associated with the authentication option is sent to the computing system in response to a selection of the at least one authentication option by the first user. The request is enriched to include a carrier identity of the first user by a mobile network operator. The first user is authenticated based at least in part on the accessed information and the carrier identity of the first user included in the enriched request.

It is contemplated that there can be many other uses, applications, and/or variations associated with the various embodiments of the present disclosure. For example, in some cases, user can choose whether or not to opt-in to utilize the disclosed technology. The disclosed technology can also ensure that various privacy settings and preferences are maintained and can prevent private information from being divulged. In another example, various embodiments of the present disclosure can learn, improve, and/or be refined over time.

Social Networking System—Example Implementation

FIG. 6 illustrates a network diagram of an example system 600 that can be utilized in various scenarios, in accordance with an embodiment of the present disclosure. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices (or systems) that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a computing device or a device having computer functionality, such as a smart-phone, a tablet, a personal digital assistant (PDA), a mobile telephone, a laptop computer, a wearable device (e.g., a pair of glasses, a watch, a bracelet, etc.), a camera, an appliance, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the Silverlight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content. As discussed previously, it should be appreciated that there can be many variations or other possibilities.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes"

another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622*a* within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include a messaging system module 646. The messaging system module 646 can, for example, be implemented as the messaging system module 106 of FIG. 1. In some embodiments, the user device 610 can include a client module 618. The client module 618 can, for example, be implemented as the client module 102 of FIG. 1. In some embodiments, an application module 662 can be implemented in an application system 660. The application module 662 can, for example, be implemented as the application module 110 of FIG. 1. As discussed previously, it should be appreciated that there can be many variations or other possibilities.

Hardware Implementation

Figure 7:
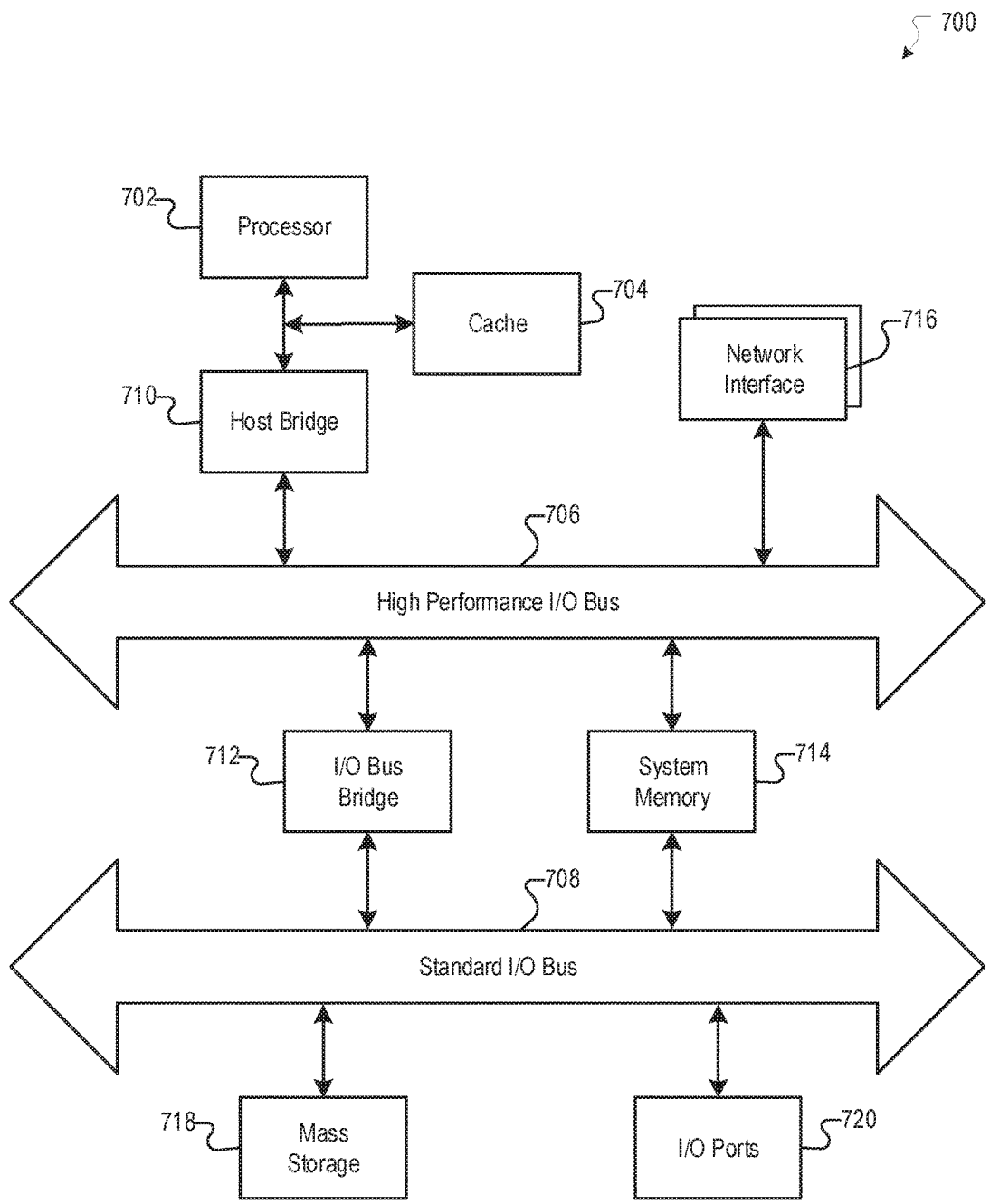
FIG. 7 illustrates an example of a computer system or computing device that can be utilized in various scenarios, according to an embodiment of the present disclosure.

The foregoing processes and features can be implemented by a wide variety of machine and computer system architectures and in a wide variety of network and computing environments. FIG. 7 illustrates an example of a computer system 700 that may be used to implement one or more of the embodiments described herein in accordance with an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 720, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   receiving, by a messaging system, at least one message sent from a computing system, the at least one message being sent to a first user by a second user, wherein the message includes an authentication option;
   wherein a request for accessing information associated with the authentication option is sent to the computing system in response to a selection of the at least one authentication option by the first user, and wherein the request is enriched to include a carrier identity of the first user by a mobile network operator; and
   wherein the first user is authenticated based at least in part on the accessed information and the carrier identity of the first user included in the enriched request.

2. The computer-implemented method of claim 1, wherein the second user is a software application running on the computing system that is configured to analyze messages addressed to the second user and to send generated responses to those messages through the messaging system.

3. The computer-implemented method of claim 2, wherein the software application is a cloud-based software application.

4. The computer-implemented method of claim 1, wherein the carrier identity corresponds to a phone number associated with the first user as determined by the mobile network operator.

5. The computer-implemented method of claim 1, wherein the at least one authentication option, when selected, accesses a Uniform Resource Locator (URL) that includes a verification token generated for the first user.

6. The computer-implemented method of claim 5, wherein the verification token generated for the first user is determined based at least in part on the accessed URL, wherein an identity of the first user in the messaging system is determined based at least in part on the verification token, and wherein a third-party account associated with the carrier identity is determined.

7. The computer-implemented method of claim 6, wherein the first user is associated with the carrier identity included in the enriched request.

8. The computer-implemented method of claim 7, wherein the carrier identity corresponds to a phone number, and wherein an account of the first user in the messaging system is associated with the phone number.

9. The computer-implemented method of claim 1, wherein the request for accessing the information is sent through the mobile network operator.

10. The computer-implemented method of claim 9, wherein the request is sent over one or more cellular networks.

11. A system comprising:
    at least one processor; and
    a memory storing instructions that, when executed by the at least one processor, cause the system to perform:
    receiving at least one message sent from a computing system, the at least one message being sent to a first user by a second user, wherein the message includes an authentication option;
    wherein a request for accessing information associated with the authentication option is sent to the computing system in response to a selection of the at least one authentication option by the first user, and wherein the request is enriched to include a carrier identity of the first user by a mobile network operator; and
    wherein the first user is authenticated based at least in part on the accessed information and the carrier identity of the first user included in the enriched request.

12. The system of claim 11, wherein the second user is a software application running on the computing system that is configured to analyze messages addressed to the second user and to send generated responses to those messages through the messaging system.

13. The system of claim 12, wherein the software application is a cloud-based software application.

14. The system of claim 11, wherein the carrier identity corresponds to a phone number associated with the first user as determined by the mobile network operator.

15. The system of claim 11, wherein the at least one authentication option, when selected, accesses a Uniform Resource Locator (URL) that includes a verification token generated for the first user.

16. A non-transitory computer-readable storage medium including instructions that, when executed by at least one processor of a computing system, cause the computing system to perform a method comprising:

receiving at least one message sent from a computing system, the at least one message being sent to a first user by a second user, wherein the message includes an authentication option;

wherein a request for accessing information associated with the authentication option is sent to the computing system in response to a selection of the at least one authentication option by the first user, and wherein the request is enriched to include a carrier identity of the first user by a mobile network operator; and wherein the first user is authenticated based at least in part on the accessed information and the carrier identity of the first user included in the enriched request.

17. The non-transitory computer-readable storage medium of claim 16, wherein the second user is a software application running on the computing system that is configured to analyze messages addressed to the second user and to send generated responses to those messages through the messaging system.

18. The non-transitory computer-readable storage medium of claim 17, wherein the software application is a cloud-based software application.

19. The non-transitory computer-readable storage medium of claim 16, wherein the carrier identity corresponds to a phone number associated with the first user as determined by the mobile network operator.

20. The non-transitory computer-readable storage medium of claim 16, wherein the at least one authentication option, when selected, accesses a Uniform Resource Locator (URL) that includes a verification token generated for the first user.

* * * * *